US 6,830,672 B2

(12) United States Patent
Okamoto (10) Patent No.: US 6,830,672 B2
(45) Date of Patent: Dec. 14, 2004

(54) PRODUCTION METHOD FOR FERRULES (75) Inventor: Shinichi Okamoto, Saitama (JP)

(73) Assignee: Hikari Tech Co., Ltd., Tokyo (JP)

( * ) Notice: Subject to any disclaimer, the term of this patent is extended or adjusted under 35 U.S.C. 154(b) by 474 days.

(21) Appl. No.: 09/890,483

(22) PCT Filed: Jan. 12, 2001

(86) PCT No.: PCT/JP01/00130
§ 371 (c)(1),
(2), (4) Date: Jul. 30, 2001

(87) PCT Pub. No.: WO01/51687
PCT Pub. Date: Jul. 19, 2001

(65) Prior Publication Data
US 2002/0157955 A1 Oct. 31, 2002

(30) Foreign Application Priority Data
Jan. 14, 2000 (JP) .................................... 2000-041991
Feb. 17, 2000 (JP) .................................... 2000-104113

(51) Int. Cl.[7] ................................................ C25D 1/10
(52) U.S. Cl. ........................................ 205/70; 205/79
(58) Field of Search ................................ 205/70, 79

(56) References Cited

U.S. PATENT DOCUMENTS 5,160,421 A 11/1992 Melnyk et al.

FOREIGN PATENT DOCUMENTS

| JP | 11-193485 | 7/1999 |
| JP | 2000-292651 | 10/2000 |
| WO | 0031574 | 6/2000 |

Primary Examiner—Kishor Mayekar
(74) Attorney, Agent, or Firm—Richard M. Goldberg (57) ABSTRACT

In the method of manufacturing a ferrule, electrocasting is carried out using at least one wire 9 such as of a metal or a plastic as a mother die, and then the wire 9 is removed from the resulting electrocast product, wherein the electrocasting treatment is carried out under rotation of the wire while it is maintained static in the longitudinal direction. According to this method, neither biased thickening nor bending occurs in the electrocast products, and they are almost free from decentering of holes. Intermediate rod products obtained after the electrocasting treatment have perfectly circular cross sections. In addition, variation in the diameter of the rod products can be reduced. Besides, agitation of the electrocasting solution can be facilitated by employing a method in which agitation is achieved by forced circulation of the liquid, and further deterioration of the electrocasting working environment can be prevented.

19 Claims, 8 Drawing Sheets

PRODUCTION METHOD FOR FERRULES

This application is a 35 U.S.C. 371 National Stage filing of PCT/JP01/00130 filed on Jan. 12, 2001.

TECHNICAL FIELD

The present invention relates to a method of manufacturing a part in a connector or a device for an optical fiber, which part is disposed at the center of the connector or of the device to hold the optical fiber and is called a ferrule.

BACKGROUND ART

Conventionally, a ferrule is in the form, for example, as shown in FIGS. 1(a)–1(d), and is usually formed of zirconia ceramics.

Figure 1A:
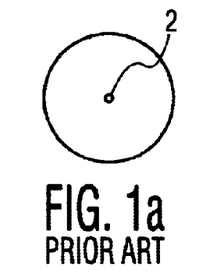
FIG. 1(a) shows a side view of a ferrule according to a prior art method.
Figure 1B:
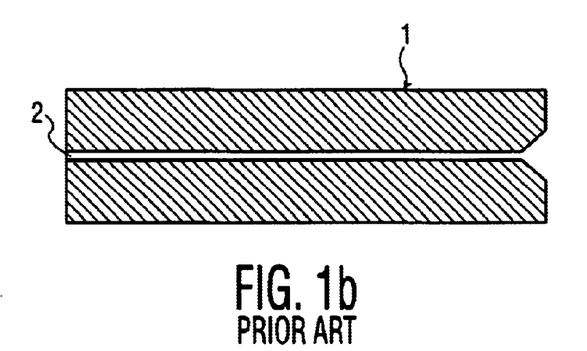
FIG. 1(b) shows a cross-sectional view of the ferrule of FIG. 1(a)
Figure 1C:
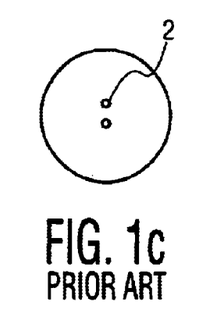
FIG. 1(c) shows a side view of another ferrule according to a prior art method.
Figure 1D:
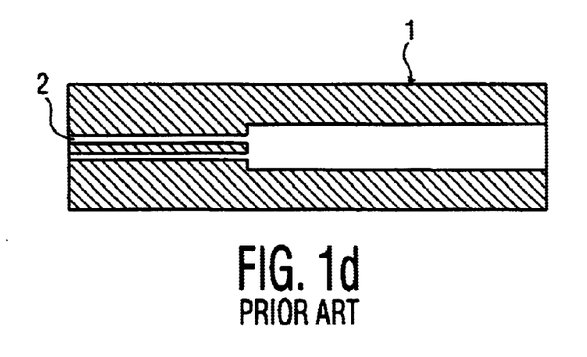
FIG. 1(d) shows a cross-sectional view of the ferrule of FIG. 1(c)

FIGS. 1(a) and 1(b) show a single-core type ferrule 1. To take an actual product for instance, it has a columnar shape having a diameter of around 2 mm and a length of around 8 mm and also has in the center a perfectly circular hole 2 with a diameter of around 0.125 mm. FIGS. 1(c) and 1(d) show a two-core type ferrule, and actual products are of like dimensions.

Meanwhile, Japanese Patent Application No. 375372/1998 filed by the inventors of the present invention proposes a metallic ferrule manufactured using a metal such as nickel by a method in which the metal is subjected to electrocasting using one or more metallic or plastic wires as mother dies, followed by machining of the resulting electrocast product after removal of the wire or wires.

Figure 2:
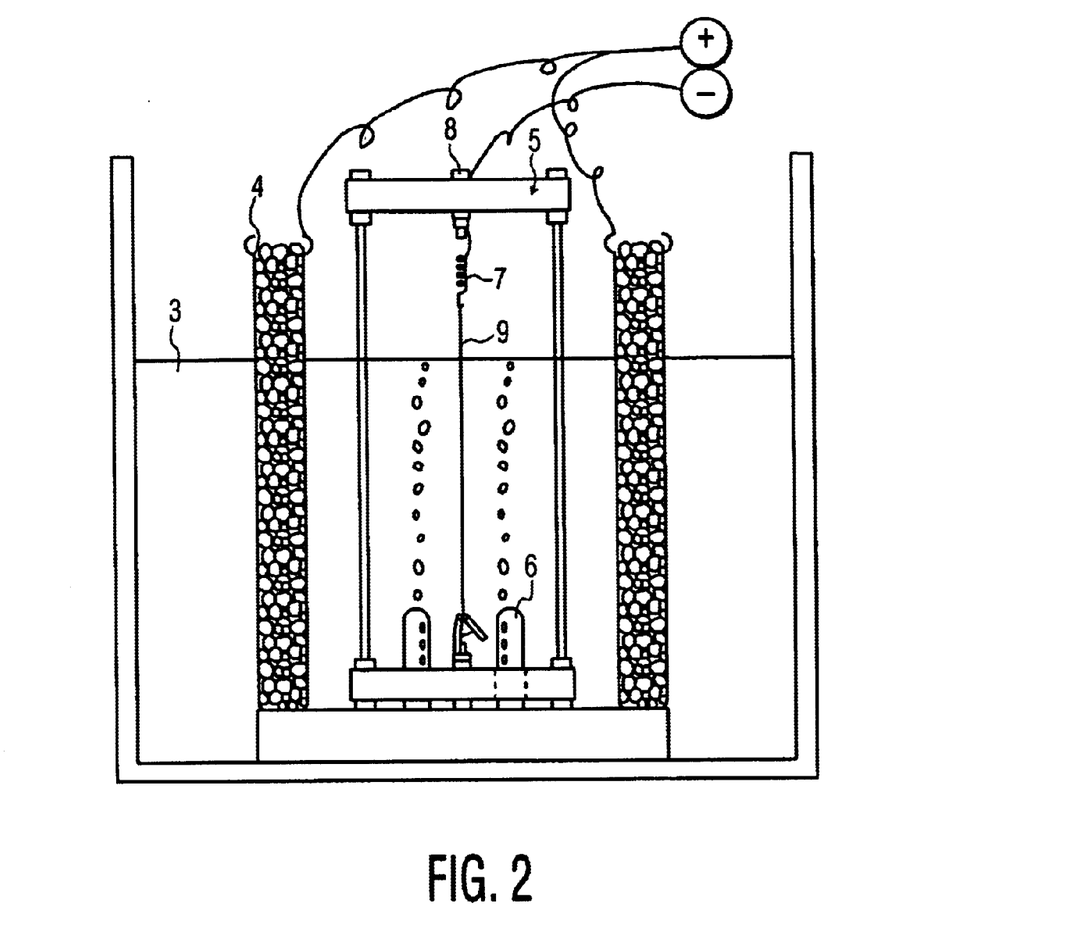
FIG. 2 is a schematic constitutional view of an electrocasting apparatus according to a prior art method.

According to the above patent, electrocasting is implemented in an apparatus, for example, as shown schematically in FIG. 2. More specifically, the apparatus is composed essentially of an electrocasting solution 3, positive electrodes 4, a holding jig 5, an air agitating nozzle 6, a spring 7, a negative electrode 8, and a length of wire 9, as shown in FIG. 2.

In the proposed method, four positive electrodes 4, each having nickel balls contained in a cylindrical titanium basket, are placed in the electrocasting solution 3 based on a warmed nickel sulfamate or the like and are arranged in the four corners of a tank 10 of the solution 3 to surround the holding jig 5. The holding jig 5, which is set in the center, is provided with the negative electrode 8. The wire 9, such as a stainless wire, is fixed to the electrode 8 and is maintained under tension by the spring 7. A direct current is sent across the electrodes to carry out electrocasting under feeding of a small amount of air through the air agitating nozzle 6. However, this method involves the following problem.

Variation in current-carrying properties at contacts of the positive electrodes 4 disposed in the four corners and cavities formed by local plugging with the nickel balls in the positive electrodes 4 are mainly causative of biased wall thickness in the electrocast part, frequently. This, in turn, causes decentering of the hole.

Further, if biased thickening occurs in the electrocast portion, the resulting rod-shaped electrocast product fails to have a perfectly circular cross section, causing difficulty in machining which follows as after-processing.

Moreover, biased thickening in the electrocast portion induces an internal stress that frequently leads to bending in the resulting electrocast product. This can cause decentering of the hole at the time of subsequent machining or can make the product unprocessable.

When a hole is to be defined in a ferrule, an extremely strict center hole accuracy is generally demanded (permissible decentering: about ±0.5 μm). This involves significant problems in the quality and the cost in that occurrence of decentering of a hole in the electrocasting process can make centering and machining of the resulting product extremely troublesome in after-processing. An excessive degree of decentering of a hole, if occurred, will make centering and machining impossible. Meanwhile, the failure in obtaining a perfectly circular cross-section additionally requires an extra prefinishing treatment by means of lathing.

In addition, since the electrocasting solution is agitated mainly by air agitation, the atmosphere in the workshop tends to be extremely humid. Since the humidity is of acidic, there have been problems that it is likely to cause troubles in the equipments used and that it deteriorates the work environment for operators.

Further, a single rectifier generally sends electricity to about 10 to 30 holding jigs 5 in manufacture, so that current-carrying properties differ greatly among the holding jigs due to corrosion at the contacts thereof, resulting in great variation in the thickness (diameter) among the finished electrocast products. Meanwhile, since the thickness of the thinnest electrocast product held on a holding jig must be increased to a predetermined diameter, this causes waste in the electrocasting time and waste of the electrocasting metal and makes machining as after-processing troublesome or difficult.

In view of the above, it is an object of the present invention to provide a method of manufacturing a ferrule in which at least one wire of metal or the like is used as a mother die to effect electrocasting and then the resulting electrocast product is machined after removal of the wire. More specifically, it is an object of the present invention, in the above method, to notably improve quality and productivity of ferrules and to reduce on a wide margin the cost of manufacturing them by implementing electrocasting without causing biasing in the wall thickness nor bending to readily meet the extremely strict center hole accuracy (permissible decentering degree: ±0.5 μm) and obtain an intermediate rod product having a perfectly circular cross section after the electrocasting treatment, by dispensing with the specific air agitation causative of various troubles and by reducing variation in the diameter among the products so as to save labor in machining as after-processing on a wide margin.

DISCLOSURE OF THE INVENTION

In order to attain the above-mentioned object, the present invention employs a method of carrying out electrocasting against wires under rotation thereof, while they are maintained static in the longitudinal directions to prevent biasing in the wall thickness of each electrocast product, as well as, bending and variation in the cross-sectional roundness thereof. The method of the present invention employs, in place of air agitation or the like, moving of the wires and the electrocasting solution, as necessary, to correct variation in the diameter among the products by making use of an ampere hour meter, for example, where leading current is stopped automatically at the stage that the ampere hour meter, reading the current for electrocasting, designates an appointed value.

BEST MODE FOR CARRYING OUT THE INVENTION

In order to explain the present invention in more detail, typical constitutions thereof will be illustrated in accordance with the accompanying drawings showing embodiments.

In the method of manufacturing a ferrule according to the present invention, where electrocasting is carried out using at least one wire 9 such as metallic wires as a mother die, the method employs a measure of carrying out electrocasting under rotation of the wires 9. Therefore, the resulting electrocast product has neither biased thickness nor bending, and this causes substantially no decentering of holes in the electrocast product. The rod-shaped intermediate products obtained after electrocasting each have a perfectly circular cross section, and variation in the diameter of the rods can be reduced. In addition, agitation of the electrocasting solution can be facilitated, since the present invention employs a measure in which agitation is achieved by forced circulation of the liquid, and further contamination of the electrocasting working environment can be prevented.

First Embodiment

Figure 3:
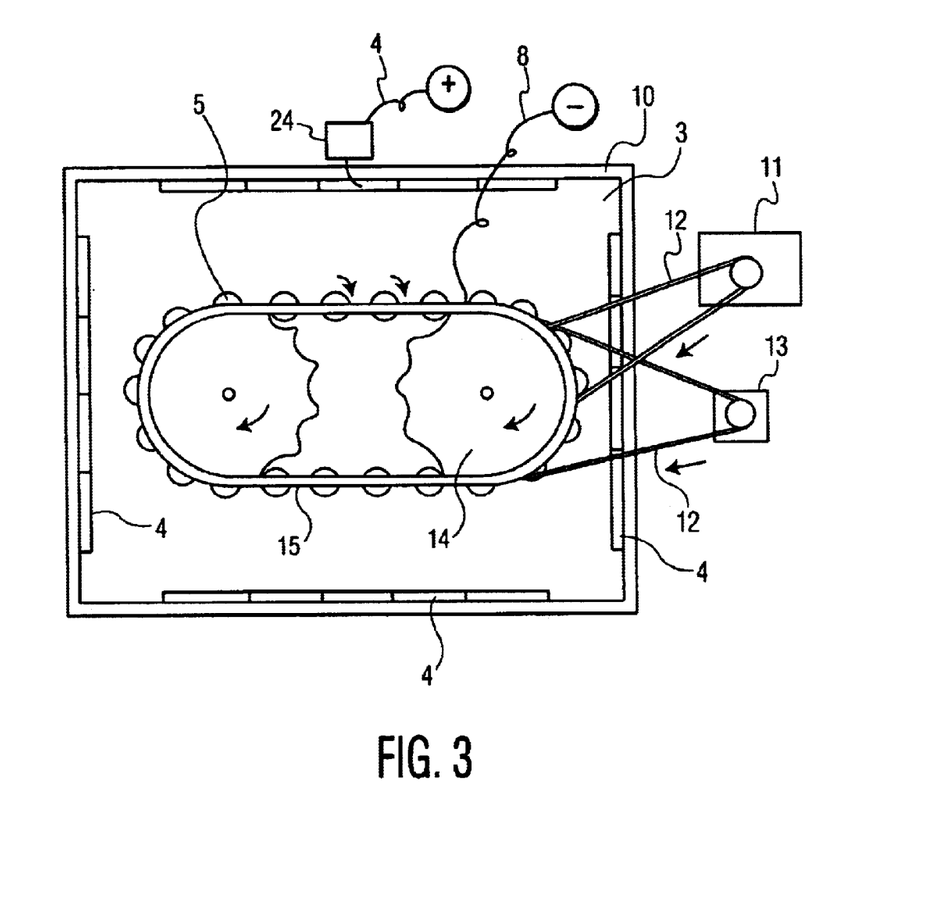
FIG. 3 is a schematic side view showing an electrocasting apparatus according to an embodiment of the present invention.

FIG. 3 shows a schematic constitution of an electrocasting apparatus according to an embodiment of the present invention.

The apparatus is composed essentially of an electrocasting solution 3, positive electrodes 4, holding jigs 5, a negative electrode 8, an electrocasting tank 10, a chain gear driving motor 11, a belt 12, a holding jig driving motor 13, chain gears 14, a chain 15, and ampere hour meter 24. The electrocasting solution 3 is charged into the electrocasting tank 10 and is warmed, filtered and agitated. A direct electric current is sent across the positive electrodes 4 and the negative electrode 8, and the rotation of the chain gear driving motor 11 is transmitted to the chain gears 14 through the belt 12 to enable the chain 15 to circulate the holding jigs, so that the holding jigs 5 can be autorotated on the axes thereof respectively by the holding jig driving motor 13 and the belt 12.

The electrocasting solution 3 depends on the material of the target electrocasting metal, and for example, nickel or an alloy thereof, iron or an alloy thereof, copper or an alloy thereof, cobalt or an alloy thereof, a tungsten alloy, and fine particle-dispersed metals can be employed, and there can be employed an aqueous solution containing as a major component an aqueous solution of nickel sulfamate, nickel chloride, nickel sulfate, ferrous sulfamate, ferrous fluoroborate, copper pyrophosphate, copper sulfate, copper fluoroborate, copper fluorosilicate, copper fluorotitanium, copper alkanolsulfonate, cobalt sulfate, sodium tungstate or the like, or such aqueous solutions each containing microparticulate silicon carbide, tungsten carbide, boron carbide, zirconium oxide, silicon nitride, alumina, diamond or the like dispersed therein.

In particular, a bath based on nickel sulfamate is well suited in terms of ease of electrocasting, diversity of physical properties including hardness, chemical stability, ease of welding, etc.

It is desired that the electrocasting solution is filtered at a high speed with a filter having a filtering accuracy of about 0.1 to 5 $\mu$m, and is warmed to be controlled to have an optimum temperature within the range of about ±3° C., that the electrocasting solution is subjected from time to time to treatment with activated carbon so as to remove organic impurity contents and that metal impurity contents such as copper are removed by charging electricity with a low current density of about 0.2 A/dm$^2$ across a nickel-plated corrugated iron sheet serving as a positive electrode and a carbon serving as a negative electrode.

While the positive electrodes 4 depend on the target electrocasting metal, a suitable material selected from nickel, iron, copper, cobalt and the like is suitably used in the form of plate or balls.

In the case where balls are used, they are contained in titanium baskets and the baskets are covered with polyester woven sacks.

While the positive electrodes 4 are arranged along the wall of the electrocasting tank 10, the arrangement of these electrodes are not to be limited thereto, but they can be arranged, for example, in one or more locations around the center of the electrocasting tank.

Meanwhile, agitation can be carried out by means of air, propeller, ultrasonic wave, super vibration, etc. However, agitation can be omitted if the orbital speed and the autorotation speed of the holding jigs are increased and if a pitting preventive is added.

Figure 4:
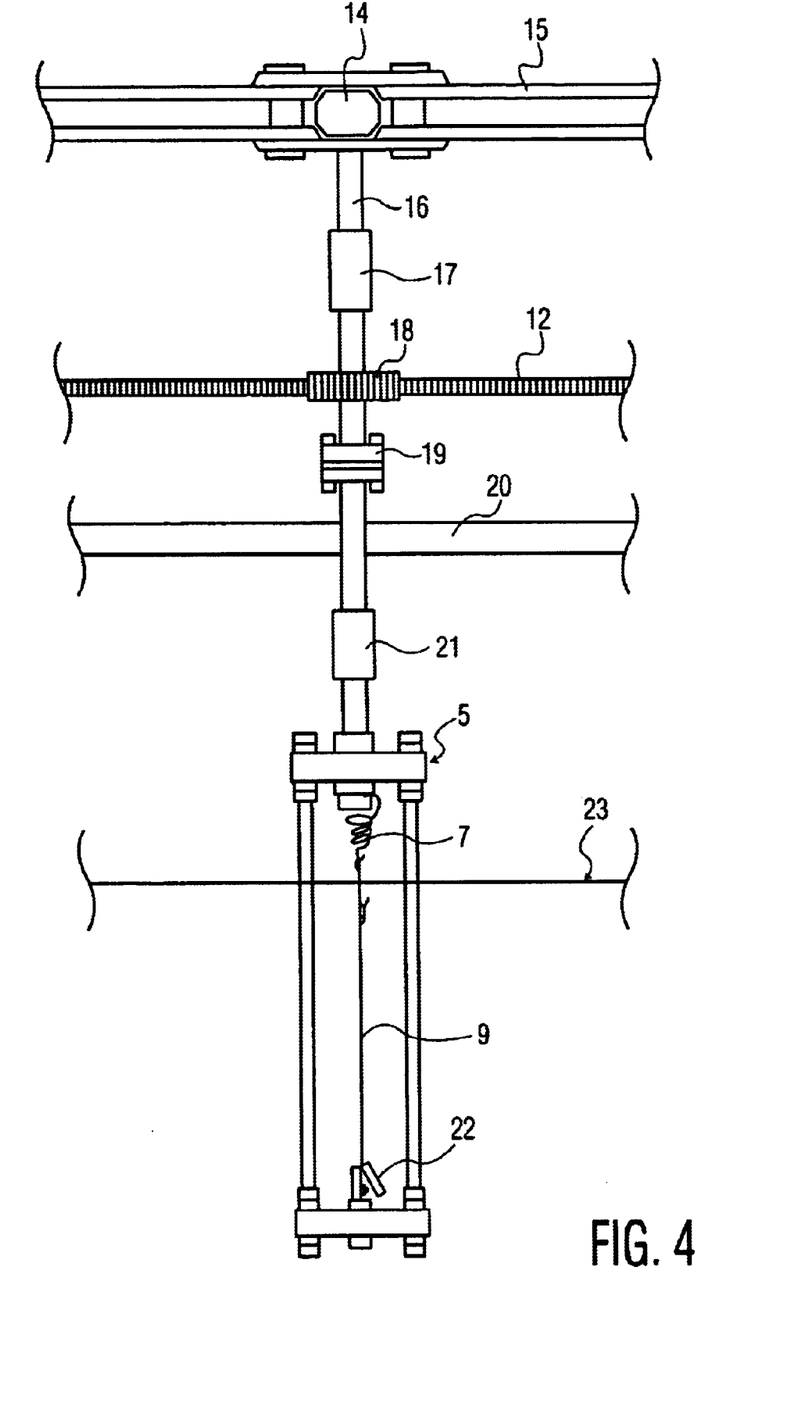
FIG. 4 is a side view showing a schematic constitution around a holding jig in a rotary electrocasting apparatus according to the present invention.

FIG. 4 shows details around the holding jig 5 according to the present invention.

In the constitution shown here contains, a chain gear 14, a chain 15, a holding rod 16, a free rotating section 17, a gear 18, a belt 12, an electrical insulating section 19, a negative electrode bar 20, a coupling 21, a holding jig 5, a spring 7, a wire 9 and a clip 22. The rotation of the chain gear 14 is designed to be transmitted to the chain 15 to circulate the holding jig 5 through the holding rod 16 welded to the chain 15 and to allow the holding jig 5 to undergo idle spinning with the aid of the free rotating section 17. The gear 18 receives the circulating motion of the belt 12 to rotate and to allow the holding jig to autorotate through the electrical insulating section 19 and the coupling 21. The holding jig 5 holds a wire 9 under tension between the clip 22 and the spring 7.

By setting the wire 9 in the holding jig 5 in this manner, the wire 9 is autorotated and circulated integrally with the holding jig 5.

The electrical insulating section 19 is brought into press contact with the negative electrode bar 20 to charge a negative current only to the lower side of the section 19 to effect electrocasting with the electrocasting solution 23 being at the liquid level as shown in FIG. 4.

Here, circulating speed and autorotation speed of the holding jig 5 are suitably about 1 cm/sec to 1 m/sec and about 10 to 500 rpm, respectively.

A 0.125 mm-diameter SUS304 wire having a perfectly circular cross section was taken and set on each electrocasting holding jig 5 under high tension with the aid of the resilience of the spring, as shown in FIGS. 3 and 4. After the thus set wire was washed with water and degreased, it was dipped in aqueous solution of a mixture of Nikkanontack A and B (NIHON KAGAKU SANGYO CO., LTD.) at ambient temperature for 10 minutes, followed by treatment with a releasing agent and washing well with water.

Meanwhile, there was prepared a tank containing an electrocasting bath based on nickel sulfamate having been subjected to high-speed filtration with a filtering accuracy of 1 μm using nickel balls as a positive electrode and warmed to 50±2° C.

Then, each holding jig 5 was connected to the electrocasting apparatus with the coupling 21 to carry out electrocasting with a current density of about 6 A/dm$^2$ for 11 hours until ampere hour meter designates an appointed value, and at an orbital speed of 5 rpm and an autorotation speed of 100 rpm and manufacture 22 pieces of rod-shaped nickel electrocast products having an average diameter of about 1.5 mm and an average length of 400 mm using the wire and the nickel balls as a negative electrode and a positive electrode, respectively. Variation in the diameter among these 22 electrocast products was within the range of ±0.2 mm, and they were free from bending and had perfectly circular cross sections.

Each electrocast product was slit at 40 mm intervals and was broken along the slits to pull out the core wire, followed by machining of the resulting pieces, for example, with a grindstone cutter, a centerless finishing machine and a grinding machine to a diameter of 1.25 mm and to a length of 6.50 mm to give MU type ferrules as finished products.

The products manufactured as described above were free from decentering of holes and were acceptable as single mode ferrule products.

Second Embodiment

Figure 5:
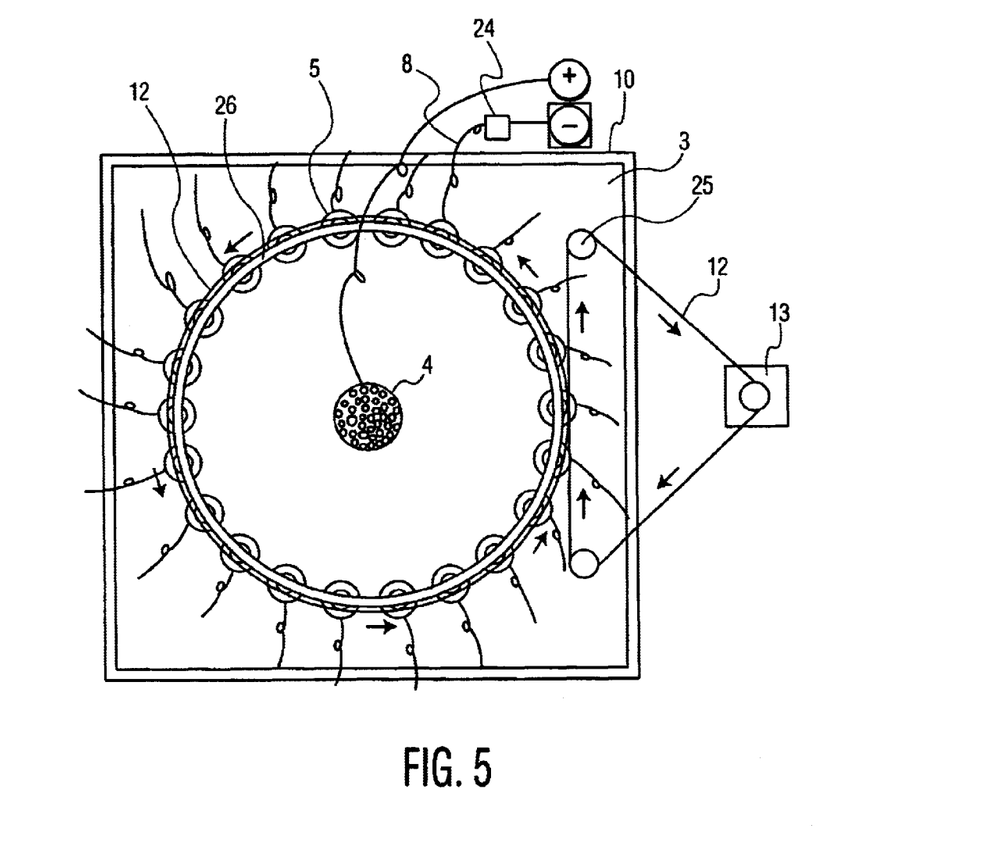
FIG. 5 is a schematic plan view showing an electrocasting apparatus according to another embodiment of the present invention.

FIG. 5 shows an electrocasting apparatus according to another embodiment of the present invention, showing a case where the holding jig 5 makes autorotation only but does not circulate.

The wire 9 is set on the holding jig 5 in the same manner as in the first embodiment and undergoes only autorotation integrally with the holding jig 5 with no circulation.

Meanwhile, the apparatus in the second embodiment is composed essentially of an electrocasting solution, 3, a positive electrode 4, holding jigs 5, negative electrodes 8, an electrocasting tank 10, a holding jig rotating motor 13, a belt 12, an ampere hour meter 24, pulleys 25 and a jig fixing structure 26. The electrocasting solution 3 was poured into the electrocasting tank 10, warmed, filtered and stirred. In this state, a direct current was charged, in a well-controlled manner, across the positive electrode 4 and the negative electrodes 8 connected to all of the holding jigs 5, as necessary, together with the ampere hour meter 24, respectively. Thus, the rotation of the holding jig rotating motor 13 was transmitted through the belt 12 and the pulleys 25 to the holding jigs 5 connected to the jig fixing structure 26 to effect electrocasting under autorotation of the holding jigs 5; whereas when a predetermined ampere hour value is achieved, the electrocasting treatment is stopped.

The electrocasting solution 3 in the second embodiment is the same as in the case of the first embodiment. The positive electrode 4 is selected likewise from nickel, iron, copper, cobalt, etc., and a plate or balls made of such materials is (are) suitably used.

It is desirable that the positive electrode 4 is located at the center of the circular jig fixing structure 26 to be substantially equidistant from all of the holding jigs 5 to obtain a constant electrocasting rate, a constant diameter and to complete the electrocasting treatment substantially simultaneously in all of the holding jigs 5. However, the location of the positive electrode 4 is not limited to this position, but a plurality of positive electrodes 4 may be arranged, for example, along the wall of the electrocasting tank 10.

In constitution of the second embodiment, it is desirable that an ampere hour meter 24 is used per holding jig 5 and that a small-size rectifier is used per holding jig 5 so as to facilitate current control. However, the present invention is not necessarily limited to this constitution, but one large-size rectifier may be used to send electric current to many holding jigs 5.

Here, the autorotation speed of the holding jigs 5 in the second embodiment is suitably about 10 to 1000 rpm.

A typical manufacturing process based on the second embodiment will be described below.

Figure 6:
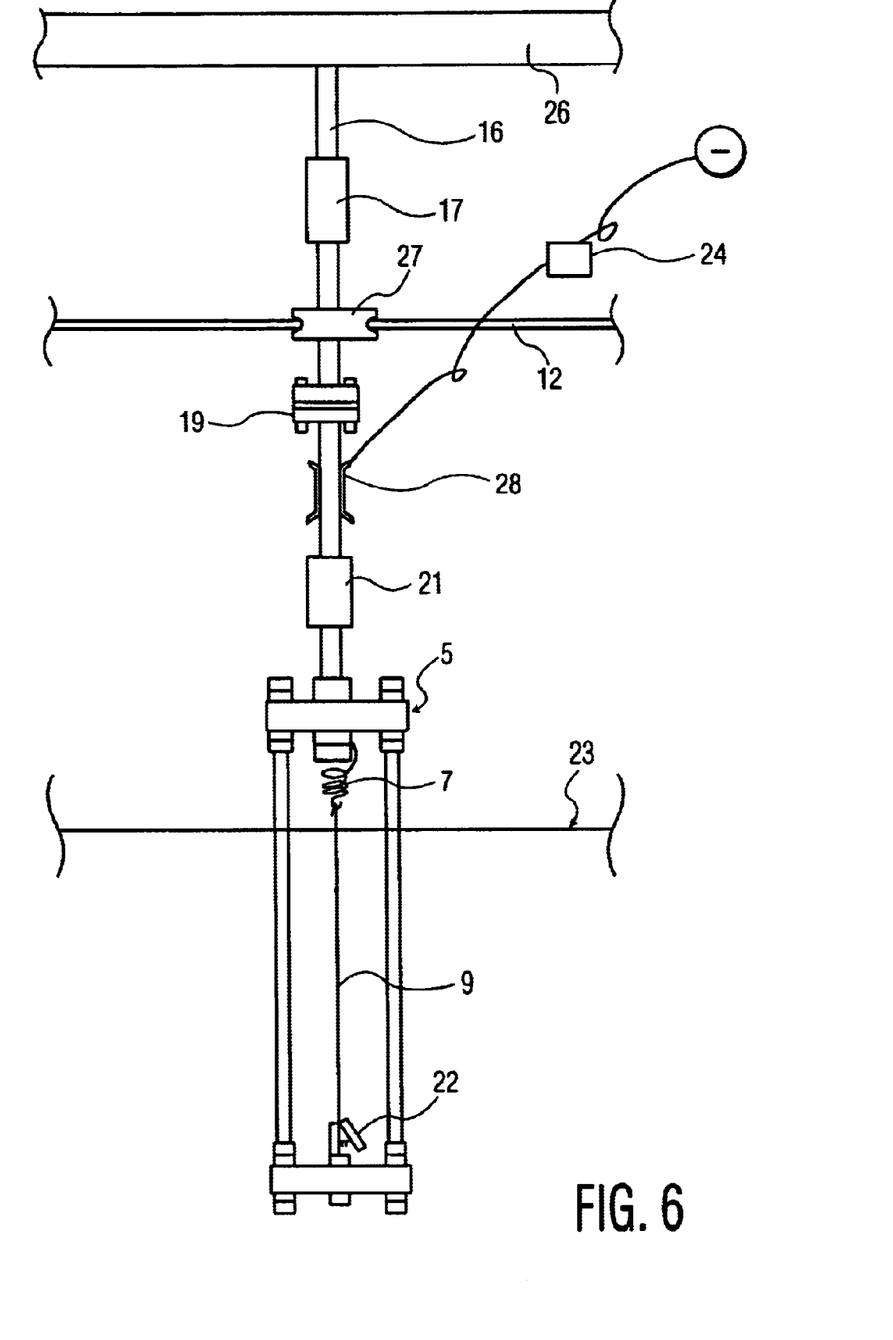
FIG. 6 is a side view showing a schematic constitution around a holding jig in a rotary electrocasting apparatus according to another embodiment of the present invention.

A 0.125 mm-diameter SUS304 wire having a perfectly circular cross section was taken and set on each electrocasting holding jig 5 under high tension with the aid of the resilience of the spring, as shown in FIG. 6. After the thus set wire was washed with water and degreased, it was dipped in aqueous solution of a mixture of Nikkanontack A and B (NIHON KAGAKU SANGYO CO., LTD.) at ambient temperature for 10 minutes, followed by treatment with a releasing agent and washing well with water.

Meanwhile, there was prepared a tank containing an electrocasting bath based on nickel sulfamate having been subjected to high-speed filtration with a filtering accuracy of 1 μm using nickel balls as a positive electrode and warmed to 50±2° C., as shown in FIG. 5.

Then, each holding jig 5 was connected to the electrocasting apparatus with the coupling 21, and the autorotation speed of the jig 5 was set to 70 rpm. The wire and the nickel balls were used as the negative electrodes and as the positive electrode respectively, and a small-size ampere hour meter was attached to each of 22 holding jigs 5.

When electrocasting treatment was carried out according to a technique in which one rectifier (max. 40A) with a current density of about 2 to 6 A/dm$^2$ is used, and electrocasting is terminated automatically at the state of ampere hour value of 4.5 A·Hr (16200 coulomb), the treatment completed in about 9±05 hours to give 22 pieces of rod-shaped nickel electrocast products having an average diameter of about 1.5 mm and an average length of 400 mm. There was substantially no variation in the diameter among these 22 electrocast products, and they were free from biased thickness and bending and had perfectly circular cross sections.

Each electrocast product was slit on the circumference at 40 mm intervals to form V grooves such that the core wire remains intact, and the core wire was pulled out from the product utilizing the phenomenon that when the electrocast product is bent along the V grooves, the electrocast portion is broken and the wire is not broken, followed by machining of the resulting pieces, for example, with a grindstone cutter, a centerless finishing machine or a grinding machine to a diameter of 1.25 mm and to a length of 6.50 mm to give MU type ferrules as finished products.

The products manufactured as described above were free from decentering of holes and were acceptable as single mode ferrule products.

Third Embodiment

FIG. 6 shows details of another embodiment according to the present invention.

Meanwhile, the apparatus in the third embodiment is composed essentially of a jig fixing structure 26, a holding rod 16, a free rotating section 17, a pulley 27, a belt 12, an electrical insulating section 19, a negative electrode spring 28, a coupling 21, a holding jig 5, a spring 7, a wire 9, a clip 22 and ampere hour meter 24. The holding rod 16 is welded to the circular jig fixing structure 26. The holding jig 5 is allowed to undergo free rotation by the free rotating section 17. The rotation of the belt 12 is transmitted to the pulley 27 to rotate it and further to autorotate the holding jig 5 through the electrical insulating section 19 and the coupling 21. The holding jig 5 holds a wire 9 under tension between the clip 22 and the spring 7. The electrical insulating section 19 is brought into press contact with the negative electrode spring 28 to charge a negative current only to the lower side of the section 19 to effect electrocasting with the electrocasting solution 23 being at the liquid level as shown in FIG. 4.

In the third embodiment, it is possible to obtain single mode ferrule products free from decentering of holes like in the first embodiment and to adjust the ferrule diameter automatically.

Here, the autorotation speed of the holding jig 5 in the third embodiment is suitably about 10 to 1000 rpm.

The wire 9 employed in the third embodiment is suitably selected from metallic wires such as iron or an alloy thereof, aluminum or an alloy thereof, copper or an alloy thereof and a tungsten alloy; such metal wires having on the surface thin solder plating layer; plastic wires such as of nylon and polyester; and ceramic wires such as of glass.

In the cases of plastic wires and ceramic wires, the wire is essentially subjected to electroless plating such as with nickel, silver or the like so as to impart conductivity thereto on their surfaces.

The wire 9 is required to have high accuracy in terms of the diameter, circularity and linearity. When the wire 9 is obtained by means of extrusion with a die, or when it is of a metal wire or a plastic wire, these accuracy values can be adjusted by means of drawing.

The electrocasting treatment is carried out in the apparatus as described above by supplying a direct current with a current density of 4 to 8 $A/dm^2$ for 10 to 20 hours, such that current is stopped automatically at the stage that ampere hour meter, reading current for electrocasting, designates an appointed value, to effect thickening to a rod having a diameter of about 0.8 to 2.8 mm. The thus obtained rod product is taken out from the electrocasting tank, washed well with water and dried.

Depending on the kind of wire 9 selected, it is decided whether the wire 9 is pulled out, pushed out or dissolved with a chemical. Generally, those which hardly dissolve in chemicals and have high tensile strength are pulled or pushed out; whereas those which dissolve easily in chemicals are subjected to dissolving.

In the case of iron or an alloy thereof, for example, the wire 9 is treated with a releasing agent, and after electrocasting is carried out to effect thickening of the wire 9 into a rod, the wire 9 may be pulled out.

In the case of the plastic wire subjected to electroless plating as described above, it can be treated likewise.

A stainless steel wire, which is an iron alloy, is preferred among others.

Referring to the machining treatment after pulling out of the wire 9, the resulting products can be subjected to finishing treatment using a numerical control unit, a centerless finishing machine, a cutter or a polishing machine.

In the case where a wire 9 soluble in a chemical is used, there may be employed a method in which a rod-shaped intermediate product is formed and then cut into pieces roughly to a predetermined length, and then the wire 9 in each piece is dissolved, followed by machining using a numerical control finishing machine after confirmation of presence of a through hole in each piece; or a method in which such pieces are subjected first to machining and then dissolution of the wire 9.

Figure 7A:
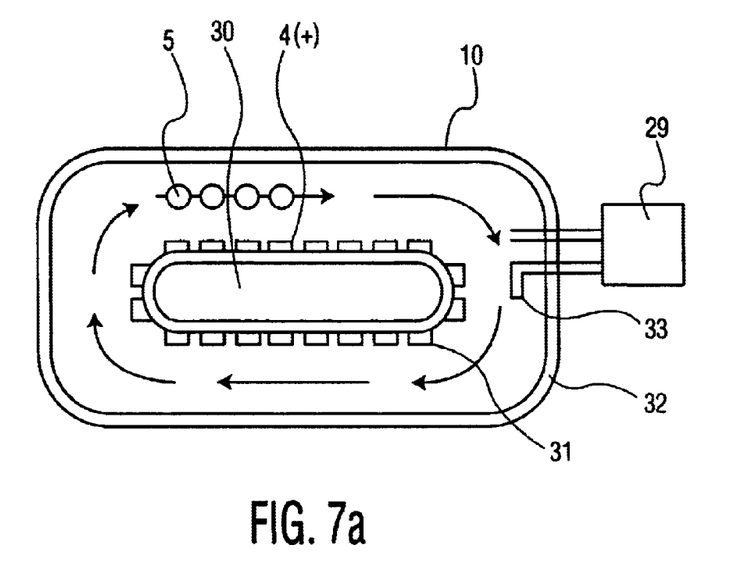
FIG. 7(a) shows a plan view of an electrocasting tank according to another embodiment of the present invention.
Figure 7B:
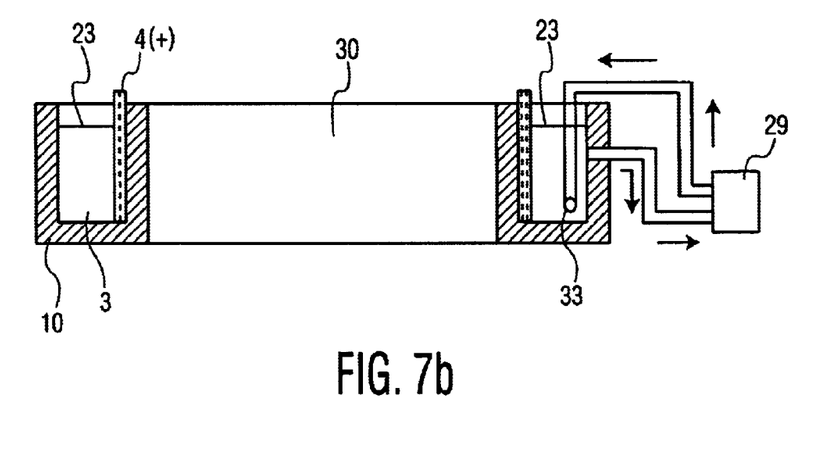
FIG. 7(b) shows a side cross-sectional view of the electrocasting tank of FIG. 7(a)

Meanwhile, as shown in FIG. 7, there may be used an elliptical or round electrocasting tank 10 containing a space (opening) 30 having a shape similar to the outer shape, in which rectangular pole-like titanium baskets containing nickel balls and contained in polyester fiber electrode sacks, respectively, are arranged along an inner wall 31 or an outer wall 32 with no clearance to carry out electrocasting under one-way jet flow of an electrocasting solution supplied from one or more nozzles 33 using one or more pumps 29 such as circulating pumps and filter pumps so as to circulate and agitate the electrocasting solution in the electrocasting tank. Utilization of this method can solve the conventional problems that the work environment is contaminated with the moisture and acidic gas to be generated by air agitation and can ensure agitation of the electrocasting solution with extreme ease.

Figure 8A:
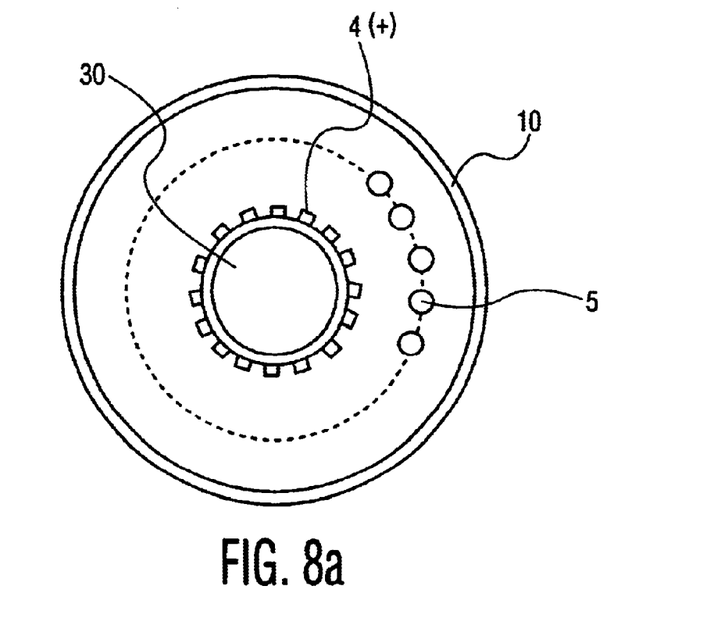
FIG. 8(a) is a plan view showing an electrocasting tank according to the present invention, showing an embodiment, in which electrocasting is carried out in the electrocasting tank under rotation thereof.
Figure 8B:
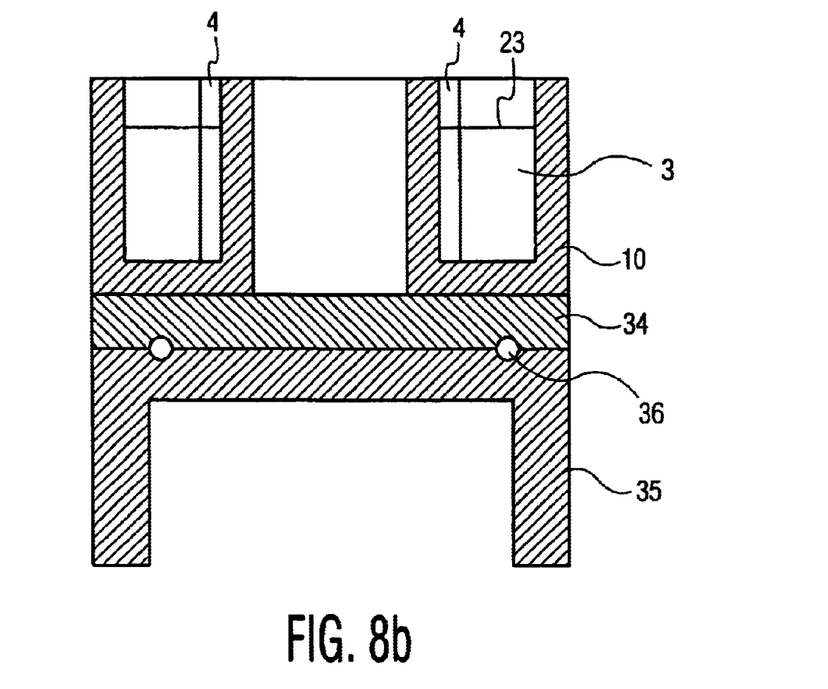
FIG. 8(b) is a side cross-sectional view of the electrocasting tank of FIG. 8(a).

Further, as shown in FIG. 8, positive electrodes 4 may be arranged along the inner wall of a round electrocasting tank 10 containing in the center a concentric round space (opening) 30. A bearing 36 is interposed between a supporting plate 34 and a base 35, and the holding jigs 5 are autorotated while the tank 10 placed on the base plate 34 is turned at a low speed. By employing this method, variation in the diameter of the resulting products can be reduced, and agitation of the electrocasting solution can be assisted by the rotation of the tank itself.

Industrial Applicability

In the present invention having the constitution described above, neither biased thickening nor bending occurs in the electrocast products formed using metal wires and the like can readily clear the extremely strict center hole accuracy (acceptable decentering: ±0.5 μm), and intermediate rod products having perfectly circular cross sections can be obtained after the electrocasting treatment. In addition, variation in the diameter of the products can be reduced. Accordingly, not only the labor in the subsequent machining step can be reduced notably, but also the quality and yield of the products can be improved on a wide margin and the electrocasting work environment can be improved simultaneously.

What is claimed is:

1. A method of manufacturing a ferrule, comprising the steps of:
    carrying out electrocasting in an electrocasting tank using at least one wire as a mother die set in at least one holding jig,
    rotating the at least one wire while maintaining the at least one wire static in a longitudinal direction of the electrocasting tank during electrocasting, and
    removing the at least one wire from a resulting electrocast product.

2. The method of manufacturing a ferrule according to claim 1, wherein the electrocasting step is carried out in the electrocasting tank under autorotation of the at least one wire together with the at least one holding jig.

3. The method of manufacturing a ferrule according to claim 2, wherein the electrocasting step is carried out in the electrocasting tank under autorotation and circulation of the at least one wire together with the at least one holding jig.

4. The method of manufacturing a ferrule according to claim 2, wherein the electrocasting step is carried out under autorotation of the at least one wire and also under rotation of the entire electrocasting tank containing a positive electrode.

5. The method of manufacturing a ferrule according to claim 2, wherein the electrocasting step is carried out under autorotation of the at least one wire together with the at least one holding jig in the electrocasting tank, and further comprising the step of stopping electrocasting treatment at a stage when a watthour meter attached to one of the holding jigs detects a predetermined watthour value so as to achieve diameter control of products to be manufactured.

6. The method of manufacturing a ferrule according to claim 2, further comprising the step of supplying a direct current from a rectifier for each holding jig.

7. The method of manufacturing a ferrule according to claim 2, wherein there are a plurality of holding jigs, and the holding jigs are arranged equidistant from a positive electrode in the electrostatic tank.

8. The method of manufacturing a ferrule according to claim 2, wherein the electrocasting step is carried out under one-way jet flow of an e electrocasting solution supplied from a nozzle of a pump into an electrocasting solution contained in the electrocasting tank so as to circulate and agitate the electrocasting solution in the electrocasting tank.

9. The method of manufacturing a ferrule according to claim 1, wherein the electrocasting step is carried out in the electrocasting tank under autorotation and circulation of the at least one wire together with the at least one holding jig.

10. The method of manufacturing a ferrule according to claim 9, wherein there era a plurality of holding jigs, and the holding jigs are arranged equidistant from a positive electrode in the electrostatic tank.

11. The method of manufacturing a ferrule according to claim 9, wherein the electrocasting step is carried out under one-way jet flow of an electrocasting solution supplied from a nozzle of a pump into an electrocasting solution contained in the electrocasting tank so as to circulate and agitate the electrocasting solution in the electrocasting tank.

12. The method of manufacturing a ferrule according to claim 1, wherein the electrocasting step is carried out under autorotation of the wire and also under rotation of the entire electrocasting tank containing a positive electrode.

13. The method of manufacturing e ferrule according to claim 12, wherein the electrocasting step is carried out under autorotation of the least one wire together with the at least one holding jig in the electrocasting tank, and further comprising the step of stopping electrocasting treatment at a stage when a watthour meter attached to one of the holding jigs detectes a predetermined watthour value so as to achieve diameter control of products to be manufactured.

14. The method of manufacturing a ferrule according to claim 12, further comprising the step of supplying a direct current from a rectifier for each holding jig.

15. The method of manufacturing a ferrule according to claim 12, wherein there are a plurality of holding jigs, and the holding jigs are arranged equidistant from a positive electrode in the electrostatic tank.

16. The method of manufacturing a ferrule according to claim 1, wherein the electrocasting step is carried out under autorotation of the at least one wire together with the at least one holding jig in the electrocasting tank, and further comprising the step of stopping electrocasting treatment at a stage when a watthour meter attached to one of the holding jigs detects a predetermined watthour value so as to achieve diameter control of products to be manufactured.

17. The method of manufacturing a ferrule according to claim 1, further comprising the step of supplying a direct current from a rectifier per holding jig.

18. The method of manufacturing a ferrule according to claim 1, wherein there are a plurality of holding jigs, and the holding jigs are arranged equidistant from a positive electrode in the electrostatic tank.

19. The method of manufacturing a ferrule according to claim 1, wherein the electrocasting step is carried out under one-way jet flow of an electrocasting solution supplied from a nozzle of a pump into a electrocasting solution contained in the electrocasting tank so as to circulate and agitate the electrocasting solution in the electrocasting tank.

* * * * *